United States Patent
Qiu

(10) Patent No.: US 10,686,789 B2
(45) Date of Patent: *Jun. 16, 2020

(54) MULTI-BLOCKCHAIN NETWORK DATA PROCESSING

(71) Applicant: Alibaba Group Holding Limited, George Town (KY)

(72) Inventor: Honglin Qiu, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/019,185

(22) Filed: Jun. 26, 2018

(65) Prior Publication Data

US 2018/0375869 A1 Dec. 27, 2018

(30) Foreign Application Priority Data

Jun. 27, 2017 (CN) .......................... 2017 1 0498932

(51) Int. Cl.
| | |
|---|---|
| *H04L 29/06* | (2006.01) |
| *G06F 21/00* | (2013.01) |
| *H04L 9/32* | (2006.01) |
| *G06F 16/27* | (2019.01) |
| *G06F 16/18* | (2019.01) |
| *H04L 9/06* | (2006.01) |

(52) U.S. Cl.
CPC .......... *H04L 63/10* (2013.01); *G06F 16/1805* (2019.01); *G06F 16/27* (2019.01); *H04L 9/06* (2013.01); *H04L 9/3239* (2013.01); *H04L 29/06068* (2013.01); *H04L 29/06163* (2013.01); *H04L 63/08* (2013.01); *H04L 2029/06054* (2013.01); *H04L 2209/38* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,651,002 | A * | 7/1997 | Van Seters | H04L 12/4625 370/392 |
| 9,608,829 | B2 * | 3/2017 | Spanos | H04L 9/3297 |
| 2016/0342978 | A1 * | 11/2016 | Davis | G06Q 20/02 |

(Continued)

FOREIGN PATENT DOCUMENTS

| | | |
|---|---|---|
| CN | 106357644 | 1/2017 |
| CN | 106530083 | 3/2017 |

(Continued)

OTHER PUBLICATIONS

International Preliminary Report on Patentability in International Application No. PCT/US2018/039734, dated May 24, 2019, 15 pages.

(Continued)

*Primary Examiner* — Lisa C Lewis
(74) *Attorney, Agent, or Firm* — Fish & Richardson P.C.

(57) ABSTRACT

A data processing request is obtained containing blockchain data and an identifier used to identify a blockchain network to which the data processing request belongs. The identifier is extracted from the data processing request. Based on the identifier, corresponding processing logic associated with the data processing request is executed. The blockchain data is stored to a blockchain storage area corresponding to the identifier.

23 Claims, 9 Drawing Sheets

(56) References Cited

U.S. PATENT DOCUMENTS

| | | | |
|---|---|---|---|
| 2017/0076306 A1* | 3/2017 | Snider | G06Q 30/0205 |
| 2017/0132625 A1 | 5/2017 | Kennedy | |
| 2017/0132626 A1* | 5/2017 | Kennedy | G06Q 20/065 |
| 2017/0163733 A1 | 6/2017 | Grefen et al. | |
| 2017/0243212 A1* | 8/2017 | Castinado | G06Q 20/401 |
| 2017/0364698 A1* | 12/2017 | Goldfarb | G06F 21/6218 |
| 2017/0366357 A1* | 12/2017 | Pattanaik | H04L 63/062 |
| 2018/0113752 A1* | 4/2018 | Derbakova | G06Q 40/025 |
| 2018/0285839 A1* | 10/2018 | Yang | G06Q 20/0655 |
| 2018/0375869 A1* | 12/2018 | Qiu | G06F 16/27 |
| 2019/0215324 A1 | 7/2019 | Qiu | |

FOREIGN PATENT DOCUMENTS

| | | |
|---|---|---|
| CN | 106598490 | 4/2017 |
| CN | 106776820 | 5/2017 |
| JP | 2016501416 | 1/2016 |

OTHER PUBLICATIONS

International Search Report and Written Opinion in International Application No. PCT/US2018/039734, dated Sep. 5, 2018, 24 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
Greenspan, "Multichain Private Blockchain," White Paper, 2015, 17 pages.

* cited by examiner

MULTI-BLOCKCHAIN NETWORK DATA PROCESSING

This application claims priority to Chinese Patent Application No. 201710498932.7, filed on Jun. 27, 2017, which is hereby incorporated by reference in its entirety.

TECHNICAL FIELD

The present application relates to the field of computer data processing technologies, and in particular, to a multi-blockchain network data processing method, apparatus, and server.

BACKGROUND

The blockchain technology, also referred to as the distributed ledger technology, is a decentralized distributed database technology characterized by decentralization, transparency, tamper-resistance, and trust. A blockchain is usually used to record transactions in public or private peer-to-peer networks, and all historical data records of asset transactions that occur between peer nodes in the network can be permanently recorded in a block. A plurality of nodes can form a blockchain network. Data information, such as linking of each new node in the blockchain network, occurrence of a transaction, and generation of a block, is broadcast to all nodes in the whole network. Each node has a full amount of consistent data (a ledger).

In a blockchain network, one node usually belongs to one blockchain network. However, with the development of business services, services of some nodes usually require participation of many participants. Therefore, a multi-blockchain network needs to be established at these blockchain nodes, so that the participant node can be connected to a plurality of different blockchain networks. The multi-blockchain network is usually formed by a plurality of isolated blockchain networks. In the multi-blockchain network, a participant node can be connected to a plurality of different blockchain networks, so as to participant in different blockchain networks. Therefore, it means that the participant node supports the multi-blockchain network, and the participant node is usually referred to as a multi-network node.

In a conventional design of a multi-blockchain network, if a participant needs to link a plurality of blockchain networks, a plurality of nodes needs to be deployed on the participant side, and a network parameter configuration of each blockchain network that each node is to link is configured for each node, so that the node accesses a corresponding blockchain network. However, in the existing design method, a participant that links a plurality of different blockchain networks is allowed to access only one blockchain network during operation. For example, a participant P either accesses a blockchain network A by enabling a node A1, or accesses a blockchain network B by enabling a node B1. If a participant needs to link another blockchain network, a currently linked blockchain network needs to be disconnected or suspended, and the participant accesses another blockchain network by enabling a network parameter configuration of the another blockchain network. Consequently, an interaction process of a service system of a multi-network node is complex, and the system design is relatively difficult. In addition, the multi-network node needs to configure different machine configurations and operation and maintenance strategies for different service volumes of a plurality of nodes. If a service volume of a particular participant alliance chain changes, a corresponding machine configuration needs to be adjusted. In such a way, stability and reliability (high availability) of a system in operation and maintenance of the multi-network node are reduced.

Therefore, in the existing multi-blockchain network, the design of a multi-network node can support only simultaneous access to one blockchain network. A participant that links a plurality of blockchain networks needs to correspondingly operate and maintain a plurality of nodes in the network link. Consequently, operation and maintenance of the entire multi-blockchain network are complex.

SUMMARY

The present application aims to provide a multi-blockchain network data processing method, apparatus, and server. A network identifier of a blockchain can be added during processing of multi-blockchain data, so that a blockchain node can simultaneously process data of a plurality of blockchain networks, system operation and maintenance costs are decreased, and operation and maintenance complexity is reduced.

A multi-blockchain network data processing method and apparatus, and a server provided in one or more embodiments of the present specification are implemented by using the following method. A multi-blockchain network data processing method is provided, and the method includes: obtaining a data processing request, and extracting an identifier in the data processing request that is used to identify a blockchain network to which the data processing request belongs; and executing corresponding processing logic on the data processing request based on the identifier.

A multi-blockchain network data processing apparatus is provided, and the apparatus includes: a network identifier extraction module, configured to: obtain a data processing request, and extract an identifier in the data processing request that is used to identify a blockchain network to which the data processing request belongs; and a data request processing module, configured to execute corresponding processing logic on the data processing request based on the identifier.

A multi-blockchain network data processing apparatus is provided, including a processor and a memory configured to store a processor executable instruction, and the processor executes the instruction to: obtain a data processing request, and extract an identifier in the data processing request that is used to identify a blockchain network to which the data processing request belongs; and execute corresponding processing logic on the data processing request based on the identifier.

A blockchain node server is provided, including at least one processor and a memory configured to store a processor executable instruction, and the processor executes the instruction to: obtain a data processing request, and extract an identifier in the data processing request that is used to identify a blockchain network to which the data processing request belongs; and execute corresponding processing logic on the data processing request based on the identifier.

Based on the multi-blockchain network data processing method, apparatus, and server provided in the present application, a network identifier of a blockchain network is used to isolate communication requests, data storage, data read and write, etc. of different blockchain networks, so that a multi-network node in a multi-blockchain network can simultaneously link different blockchain networks, so as to simultaneously process data of a plurality of blockchain networks. By using the implementation solutions of the present application, system complexity of operation and maintenance of a multi-network node can be effectively reduced, complexity and difficulty of node operation and maintenance and system interaction of a service system that participates in an entire network can be reduced, and a data processing capability of a multi-blockchain network and system stability and reliability can be improved.

BRIEF DESCRIPTION OF DRAWINGS

To describe the technical solutions in the embodiments of the present application or in the existing technology more clearly, the following briefly introduces the accompanying drawings required for describing the embodiments or the existing technology. The accompanying drawings in the following description show some embodiments described in the present application, and a person of ordinary skill in the art can still derive other drawings from these accompanying drawings without creative efforts.

DESCRIPTION OF EMBODIMENTS

To make a person skilled in the art understand the technical solutions in the present application better, the following describes the technical solutions in the embodiments of the present application with reference to the accompanying drawings in the embodiments of the present application. The described embodiments are not all of the embodiments of the present application. All other embodiments obtained by a person of ordinary skill in the art based on the embodiments of the present application without creative efforts shall fall within the protection scope of the present application.

Figure 1:
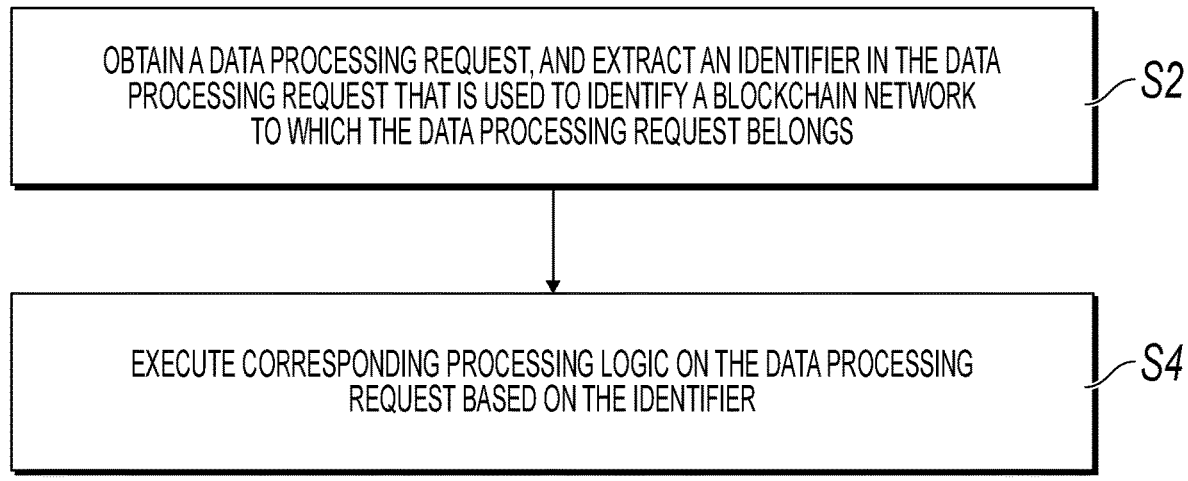
FIG. 1 is a schematic flowchart illustrating an embodiment of a multi-blockchain network data processing method, according to the present application.

FIG. 1 is a schematic flowchart illustrating an embodiment of a multi-blockchain network data processing method, according to the present application. Although the present application provides method operation steps or apparatus structures shown in the following embodiments or accompanying drawings, conventionally or without creative efforts, the method can include more operation steps or fewer operation steps after combination of some operation steps, or the apparatus can include more modules and units or fewer modules and units after combination of some modules and units. For steps or structures not necessarily bound to logical causality, an execution sequence of these steps or a module structure of the apparatus is not limited to the execution sequence or module structure shown in the embodiments or accompanying drawings of the present application. When used in an actual apparatus, server, or terminal product, the method or module structure can be executed in a sequence based on the method or module structure shown in the embodiment or the accompanying drawings or can be executed in parallel (for example, an environment of parallel processors or multi-thread processors, or even an implementation environment of distributed processing and server clustering).

A detailed embodiment is shown in FIG. 1. In an embodiment of a multi-blockchain network data processing method provided in the present application, the method can include the following steps:

S2. Obtain a data processing request, and extract an identifier in the data processing request that is used to identify a blockchain network to which the data processing request belongs.

S4. Execute corresponding processing logic on the data processing request based on the identifier.

In the present application, a network configuration of a multi-blockchain network can be designed in advance. By modifying a method for storing blockchain data of a node, a structure of a message communicated between blockchain network nodes, data processing logic of a multi-network node, etc., nodes (that is, multi-network nodes described in the present application) of a plurality of blockchain networks are added to the multi-blockchain network, so as to simultaneously access the plurality of blockchain networks and simultaneously process data of the plurality of blockchain networks. The previous embodiment in the present application can be applied to a multi-network node in a multi-blockchain network. The multi-blockchain network usually includes at least one multi-network node.

It should be noted that the node in the present application is usually a blockchain node on which a participant in a blockchain network is located. The node can include at least one terminal device, such as a physical server, a distributed system, a server cluster, or a client, and uses a necessary application, service system, program component, etc. In the blockchain network in the present application (the multi-blockchain network can be considered as a blockchain network including a multi-network node), the node can include a program application deployed on physical hardware. The program application can link different blockchain networks based on the implementation solution provided in the present application. For example, a system node server links a public blockchain network A and an alliance-specific blockchain network B. In existing technology, a node A1 used to access the public blockchain network A and a node B1 used to access the alliance-specific blockchain network B need to be separately configured. However, in the present application, a node P can be directly deployed, and the node P can access both the public blockchain network A and the alliance-specific blockchain network B, and can process data packets of the two networks. Therefore, system configuration is simplified, data exchange complexity is reduced, data processing efficiency and stability of a server are improved, and high availability of the server is ensured.

The following uses a detailed implementation example of modifying a multi-network node to describe the implementation solution of this embodiment. In this embodiment, an objective of the present application can be achieved by modifying a method for storing blockchain data of a multi-network node, a structure of a message communicated between all nodes in a multi-blockchain network, data processing logic of a multi-network node, etc. Specifically, the following modifications can be included:

Modification at a communication layer: A main processing method includes: In a communication process of transmitting a message in a multi-blockchain network, it is set that the message transmitted between nodes carries an identifier of a blockchain network to which the message belongs (or it can be understood as that the message comes from the blockchain network). In a detailed implementation, it can be set that a communication request or acknowledgement content transmitted between all the nodes in the multi-blockchain network includes an identifier field of a blockchain network to which the communication request or the acknowledgement content belongs.

Figure 2:
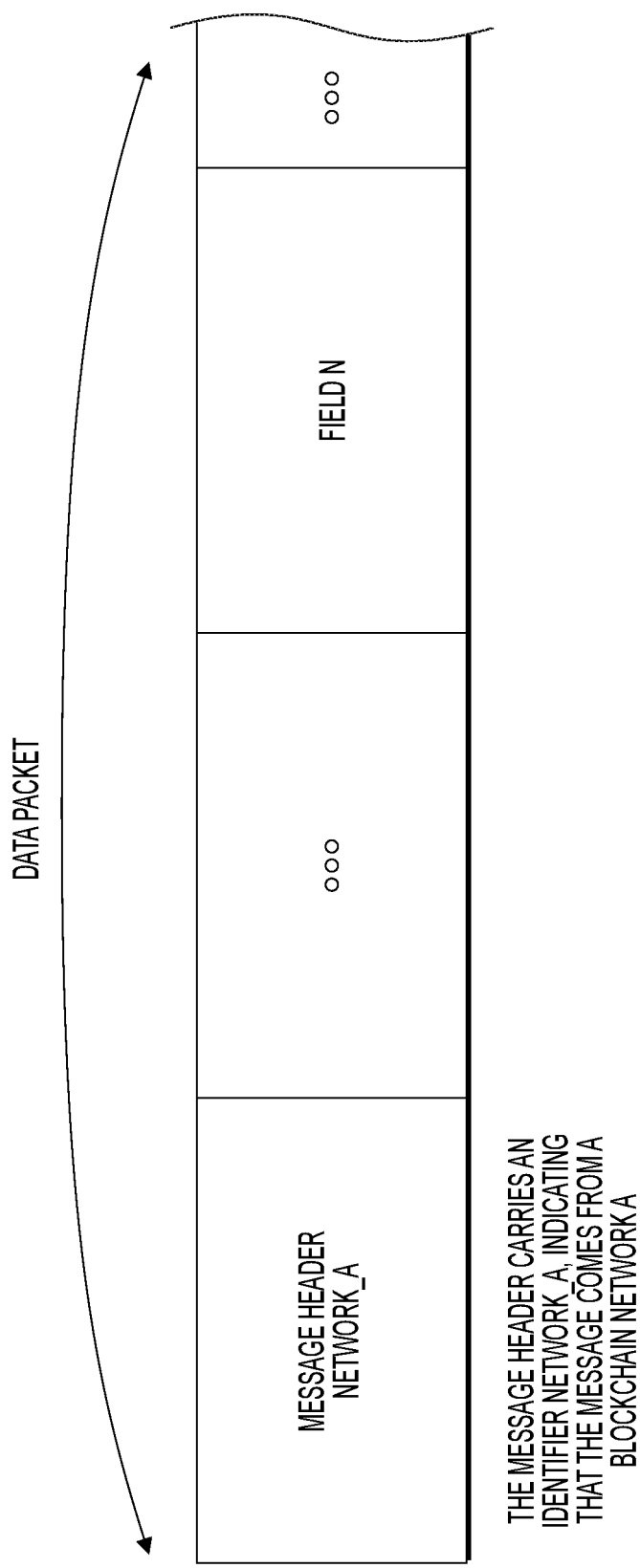
FIG. 2 is a schematic diagram illustrating a data format of a message communicated in a multi-blockchain network, according to the present application.

As shown in FIG. 2, FIG. 2 is a schematic diagram illustrating a data format of a message communicated in a multi-blockchain network. A message transmitted between the nodes can be in various types, such as a data storage request, a node data read request, a notification message, a forwarded message, an instruction operation, etc. For ease of description, in this embodiment of the present application, messages transmitted between the nodes in the multi-blockchain network can be collectively referred to as a data processing request. The data processing request can include a message sent by a single node linking a blockchain network and received by a multi-network node, or can include a message sent by the multi-network node to the single node or a message sent by the multi-network node.

The identifier can identify, by using a plurality of data formats, a blockchain network to which the data processing request belongs. For example, a character string of each blockchain network can be set by using a uniform rule, and the character string is used as an identifier. For example, for the public blockchain network A and the alliance-specific blockchain network B, "network 1" and "network 2" can be respectively set to represent the public blockchain network A and the alliance-specific blockchain network B. In another embodiment of the method provided in the present application, the identifier can be generated based on a network identifier of a blockchain network.

Specifically, a network identifier of a blockchain network can be directly used as the identifier, or the identifier can be generated by adding some other characters or making some variations based on the network identifier of the blockchain network. For example, if the public blockchain network A and the alliance-specific blockchain network B have respective network identifiers "network_A" and "network_B", "network_A" can be directly used as an identifier of a blockchain network carried in all data processing requests in the public blockchain network A, and correspondingly, "network_B" can be directly used as an identifier of a blockchain network carried in all data processing requests in the alliance-specific blockchain network B. The identifier can alternatively obtained after some processing is performed on an original network identifier. For example, the network identifier "network_A" can be modified to "network_A_Pub", and "network_A_Pub" is used as the identifier of the blockchain network carried in all the data processing requests in the public blockchain network A.

Figure 3:
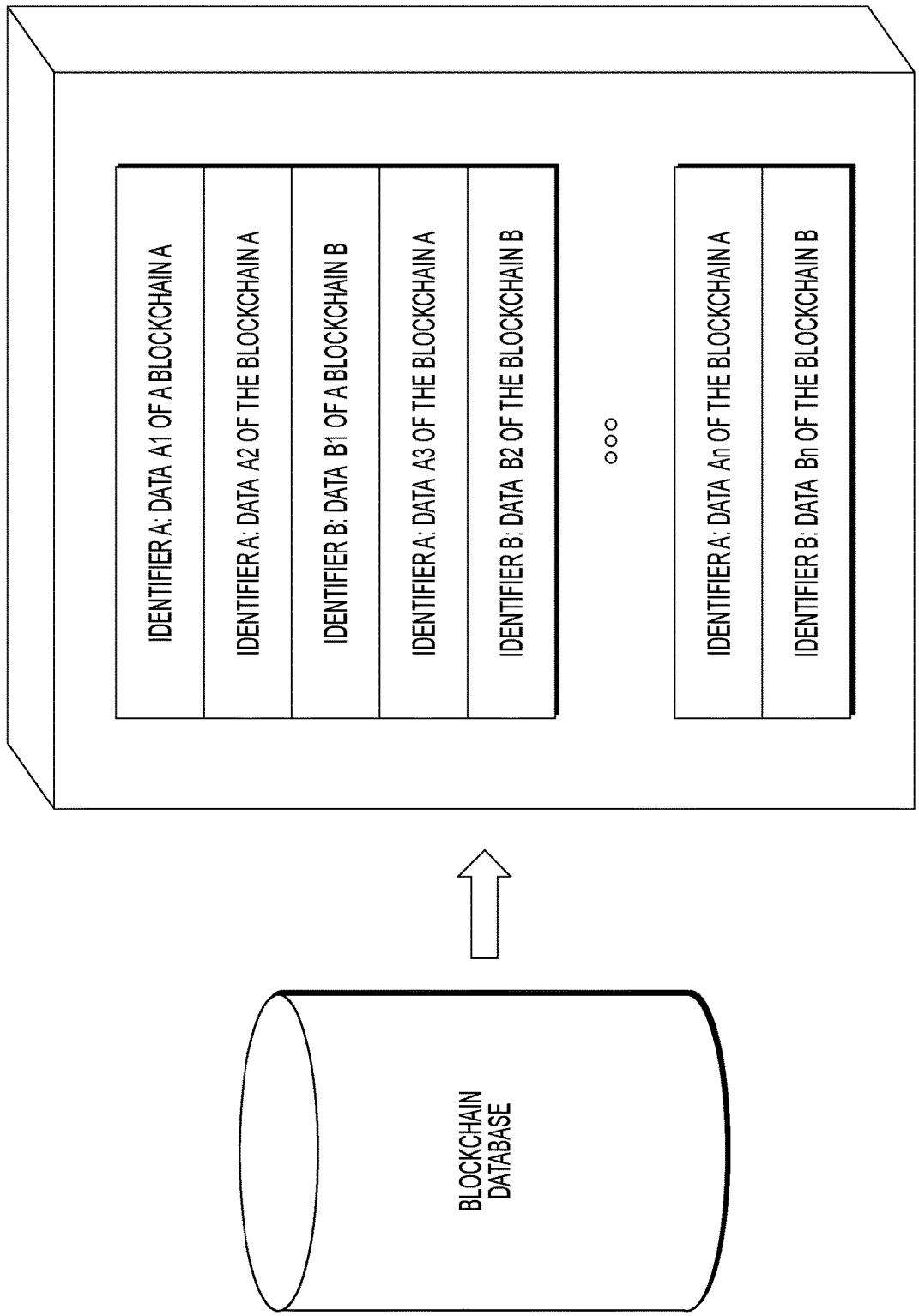
FIG. 3 is a schematic diagram illustrating storing data of different blockchain networks by a node, according to an embodiment of the present application.

Modification at a data storage layer: When storing blockchain data of the multi-network node, the node can use identifiers to distinguish data of different blockchain networks, and can use the identifiers to isolate data storage in the different blockchain networks during data storage. The isolation includes at least logically storing data of different blockchain networks separately. As shown in FIG. 3, FIG. 3 is a schematic diagram illustrating storing data of different blockchain networks by a node, according to an embodiment of the present application. In some implementation scenarios, data of different blockchain networks can be in mixed storage in a segment of physical storage space, for example, stored in a physical storage medium in a data receiving time sequence.

Figure 4:
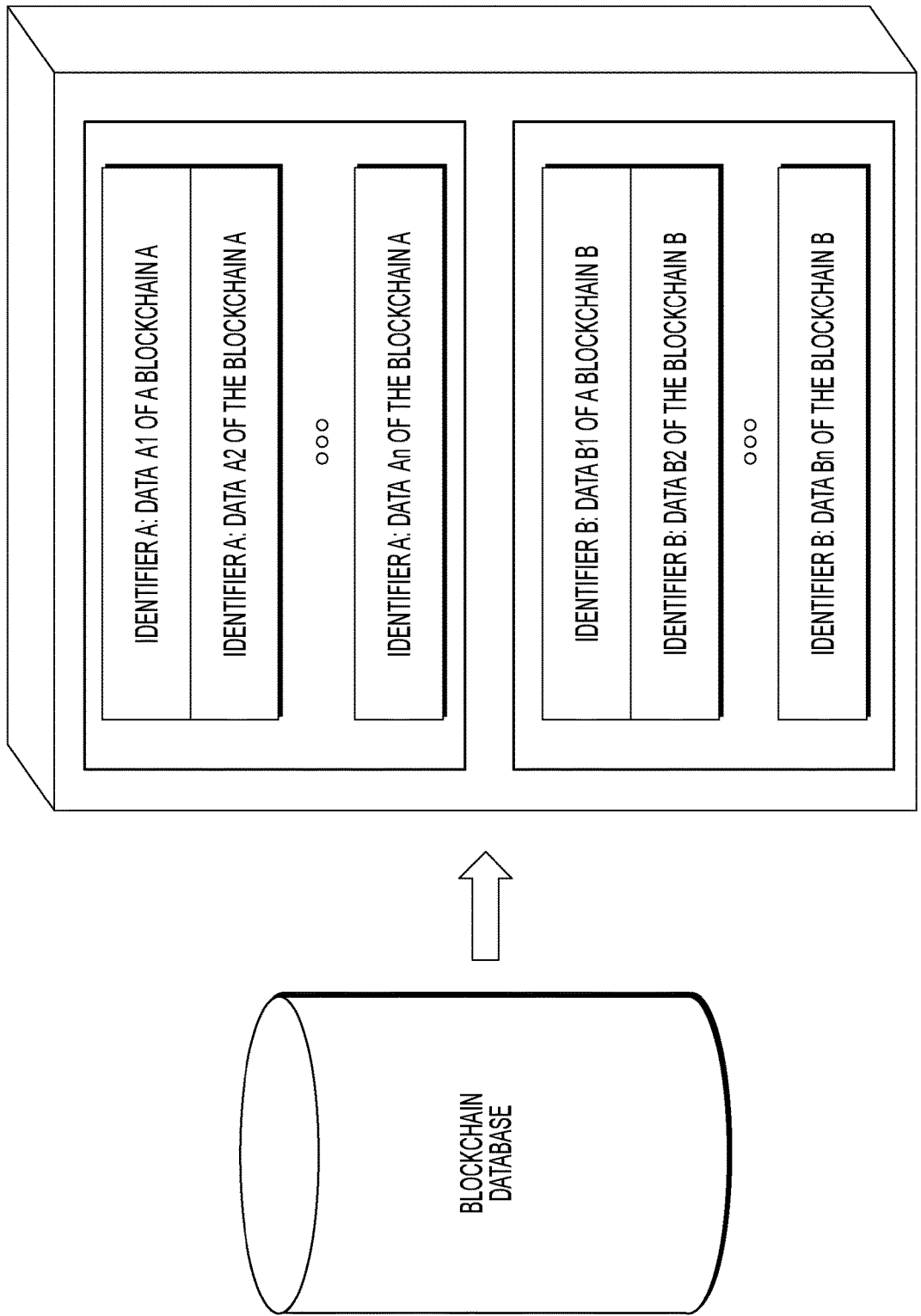
FIG. 4 is another schematic diagram illustrating storing data of different blockchain networks by a node, according to an embodiment of the present application.

In another storage method, a multi-network node can be divided into storage space for different blockchains, and the storage space is physically separate. When data needs to be stored, the data can be stored to blockchain storage space corresponding to an identifier based on the identifier. As shown in FIG. 4, FIG. 4 is another schematic diagram illustrating storing data of different blockchain networks by a node, according to an embodiment of the present application. Different blockchain storage areas can be separately set, and each blockchain storage area can be used to store corresponding service data. Therefore, in another embodiment of the method provided in the present application, the data processing request can include a data storage request message, and correspondingly, the executing corresponding processing logic on the data processing request based on the identifier includes the following step:

S20. Store blockchain data in the data processing request to a blockchain storage area corresponding to the identifier.

As shown in FIG. 4, a multi-network node P links the public blockchain network A and the alliance-specific blockchain network B, and two storage areas can be set on the multi-network node P. When receiving a data processing request requesting data storage, a blockchain network to which the data processing request belongs can be determined based on an identifier included in the data processing request, and then blockchain data (which is usually service data generated by the node) included in the data processing request can be stored to a corresponding blockchain network storage area. For example, if an identifier included in a data processing request MSG_Stor is "network_A", it indicates that the data processing request comes from the public blockchain network A, and service data in the data processing request MSG_Stor can be stored to a storage area in the public blockchain network A.

Further, if the multi-network node receives a data processing request requesting data reading, a linked blockchain network from which the data processing request comes can be confirmed based on an identifier included in the data processing request, and then a corresponding blockchain storage area is located to read requested blockchain data. Therefore, in another embodiment of the method in the present application, the data processing request can include a data read request message, and correspondingly, the executing corresponding processing logic on the data processing request based on the identifier includes the following step:

S40. Read blockchain data in a blockchain storage area corresponding to the identifier.

In the implementation solution of the present application, communication, storage, etc. can be distinguished by using an identifier field identifying a blockchain network to which a data processing request belongs, so that a multi-network node can simultaneously read and write data of different blockchain networks, to simultaneously process data of a plurality of networks.

In another aspect, node processing logic is modified. The modification mainly includes the following: When a data processing request sent by a node in a multi-blockchain network is received, a blockchain network to which a data packet of the data processing request belongs is determined based on an identifier included in the processing request. A receiver can perform corresponding logic based on the identifier, including the previous data storage and data reading. The data processing request can further include another type of message exchanged between nodes. The data processing request includes a node communication message, and correspondingly, the executing corresponding processing logic on the data processing request based on the identifier includes the following step:

S60. Exchange the node communication message in the blockchain network corresponding to the identifier.

Figure 5:
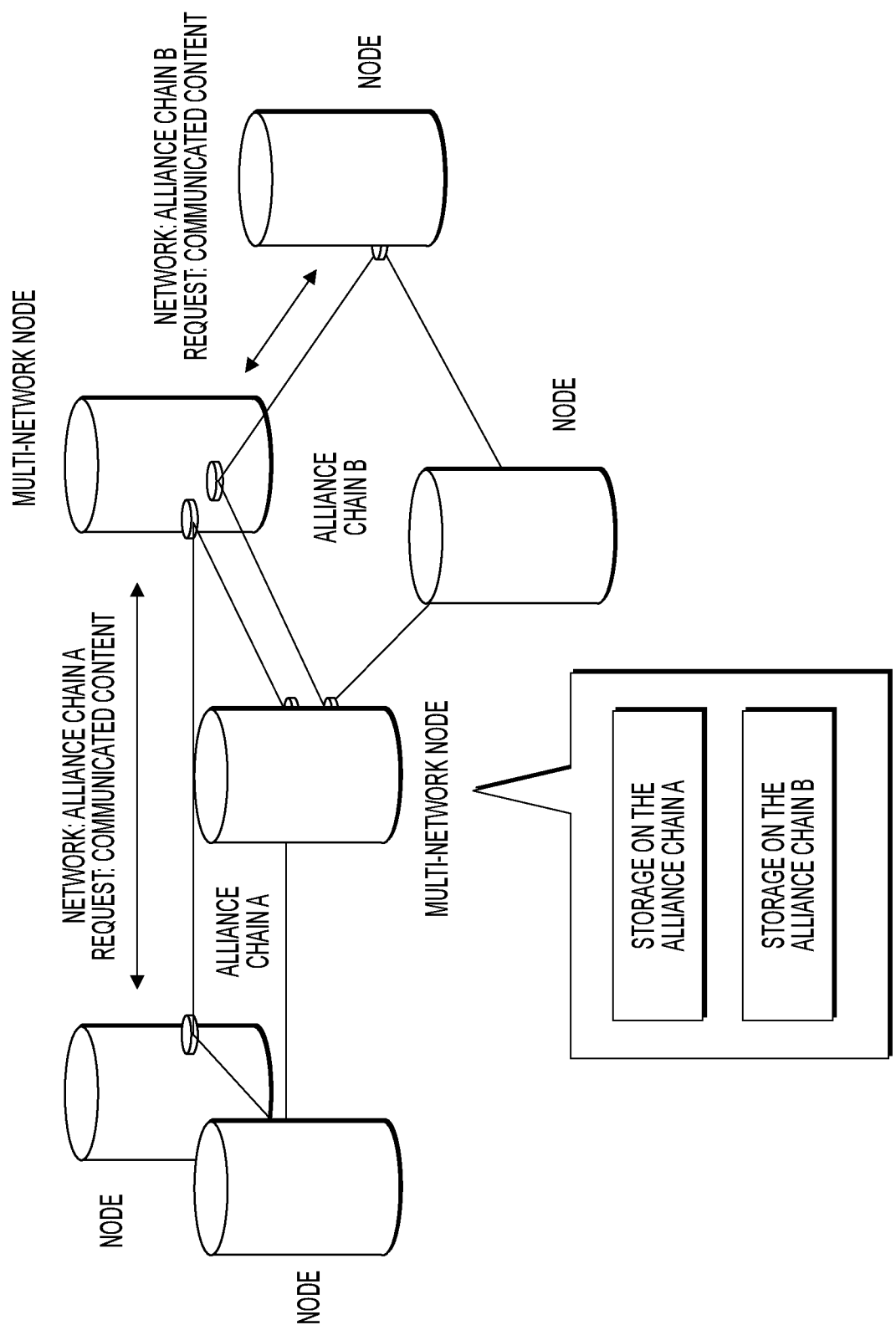
FIG. 5 is a schematic diagram illustrating a detailed implementation scenario of the method provided in the present application.

In this way, in one or more embodiments of the present specification, identifiers of a plurality of blockchain networks can be used to distinguish the blockchain networks in a multi-network node that links different blockchain networks. Therefore, a plurality of single nodes, in a plurality of blockchain networks that originally require operation and maintenance can be combined into one node for processing, so that a node can simultaneously link different blockchain networks. In addition, a message exchanged in a multi-blockchain network can be exchanged between service systems of different nodes when the message carries the identifier, so that design complexity of the service system can be reduced. Moreover, the node has a simpler configuration, simpler operation and maintenance strategies, etc. for a machine based on a service volume. Even if there is a node change, impact on an entire blockchain network is reduced compared with an existing implementation solution. FIG. 5 is a schematic diagram illustrating a detailed implementation scenario of the method provided in the present application. Both two multi-network nodes shown in FIG. 5 link an alliance chain A and an alliance chain B. A communication request (request) between nodes on the alliance chain A can be transmitted in a blockchain network of the alliance chain A. If data needs to be stored in the multi-network node, the data can be stored to a corresponding storage area on the alliance chain A or a corresponding storage area on the alliance chain B based on a network identifier "network". Based on the blockchain data processing method provided in the present application, a network identifier of a blockchain network is used to isolate communication requests, data storage, data read and write, etc. of different blockchain networks. Therefore, a multi-network node in a multi-blockchain network can simultaneously link different blockchain networks, so as to simultaneously process data of a plurality of blockchain networks. By using the implementation solution of the present application, system complexity of operation and maintenance of a multi-network node can be effectively reduced, complexity and difficulty of node operation and maintenance and system interaction of a service system that participates in an entire network can be reduced, and a data processing capability of a multi-blockchain network can be improved.

Figure 6:
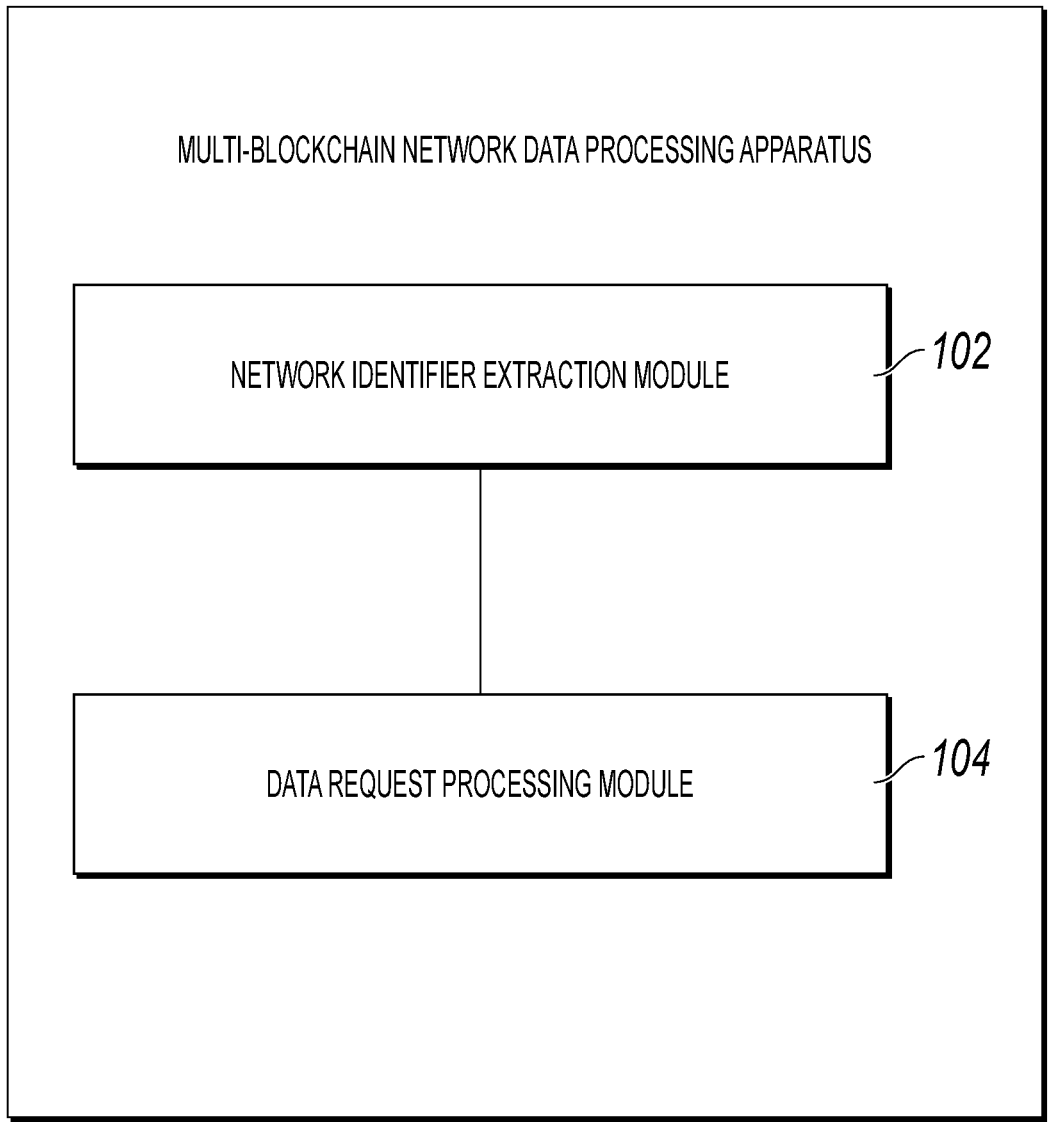
FIG. 6 is a schematic structural diagram illustrating an embodiment of a module of a multi-blockchain network data processing apparatus, according to the present application.

Based on the previous blockchain data processing method, the present application further provides a multi-blockchain network data processing apparatus. The apparatus can include a system (including a distributed system), software (an application), a module, a component, a server, a client, a quantum computer, etc. that use the method according to the present application, and an apparatus that uses necessary implementation hardware. Based on a same disclosing concept, an apparatus in an embodiment provided in the present application is described in the following embodiments. Because an implementation solution of resolving a problem by using the apparatus is similar to that of the method, for detailed apparatus implementation in the present application, reference may be made to implementation of the previous method, and details are not repeated here again. The term "unit" or "module" used below can implement a combination of software and/or hardware that implement a predetermined function. Although the apparatus described in the following embodiment is preferably implemented by using software, implementation of hardware or a combination of software and hardware may also be conceived. Specifically, FIG. 6 is a schematic structural diagram illustrating a module of an embodiment of a multi-blockchain network data processing apparatus, according to the present application. As shown in FIG. 6, the apparatus can include: a network identifier extraction module 102, configured to: obtain a data processing request, and extract an identifier in the data processing request that is used to identify a blockchain network to which the data processing request belongs; and a data request processing module 104, configured to execute corresponding processing logic on the data processing request based on the identifier.

As described previously, in an embodiment, the identifier can be generated based on a network identifier of a blockchain network. For example, an original network identifier of the blockchain network to which the data processing request belongs can be directly used.

In another embodiment, the request processing module 104 can include: a data storage unit 1040, configured to: when the data processing request includes a data storage request message, store blockchain data in the data processing request to a blockchain storage area corresponding to the identifier.

In another embodiment, the request processing module 104 can include: a data read unit 1042, configured to: when the data processing request includes a data read request message, read blockchain data in a blockchain storage area corresponding to the identifier.

Figure 7:
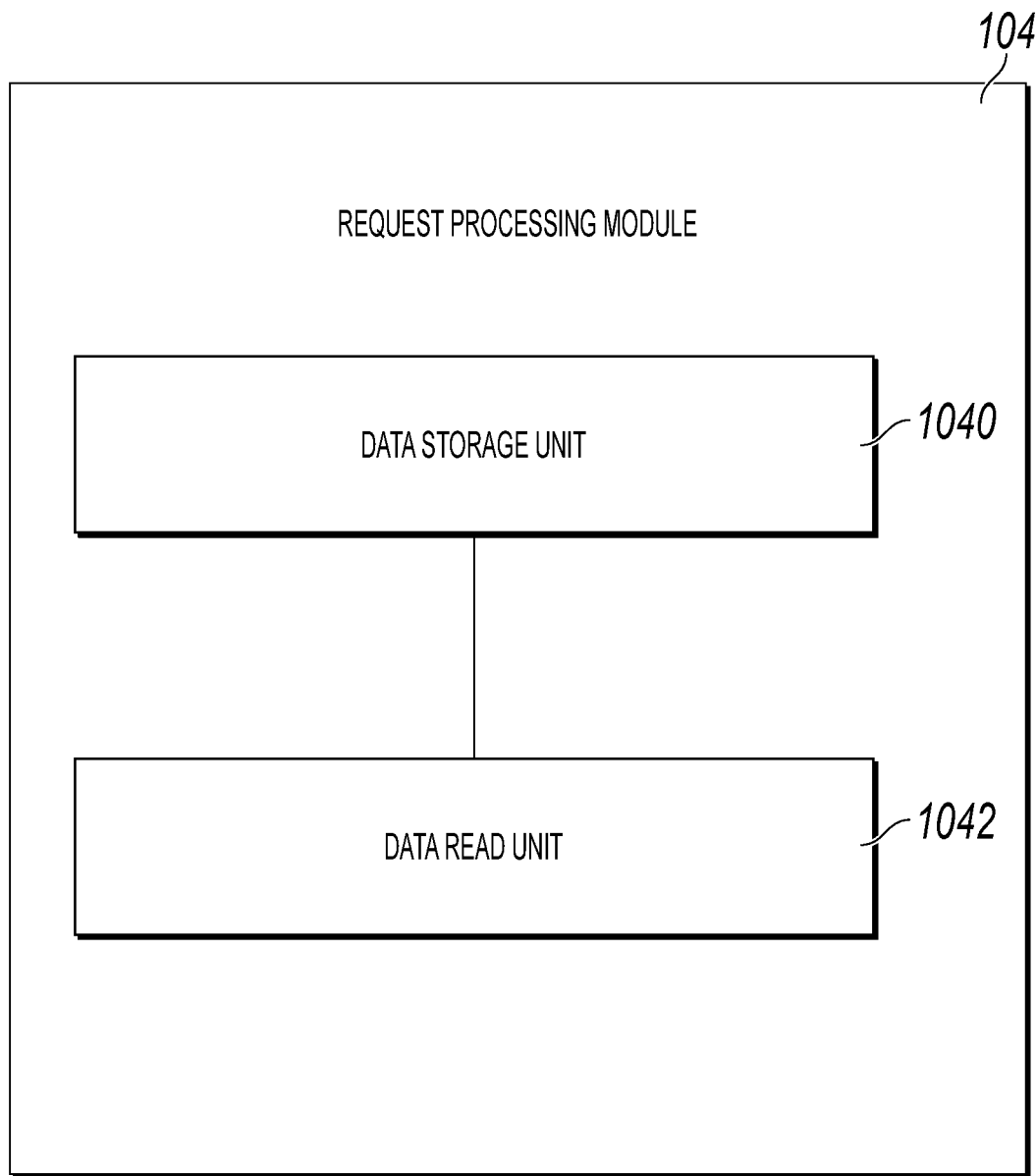
FIG. 7 is a schematic structural diagram illustrating an embodiment of a request processing module, according to the present application.

FIG. 7 is a schematic structural diagram illustrating an embodiment of the request processing module, according to the present application.

In another embodiment, the request processing module 104 can include: a data communication unit 1046, configured to: when the data processing request includes a node communication message, exchange the node communication message in the blockchain network corresponding to the identifier.

It can be understood that, based on the descriptions of the previous method embodiment, a message communicated between nodes can include a data processing request requesting blockchain data storage and a data processing request requesting blockchain data reading. Therefore, in another implementation of the apparatus, the data communication unit 1046 can include at least one of the data read unit 1042 or the data storage unit 1040. In addition, the data storage unit 1040 and the data read unit 1042 can be one processing unit in some implementations, such as a data read/write unit implemented by hardware, and the data read/write unit can implement processing capabilities of the data storage unit 1040 and the data read unit 1042.

The blockchain data processing method provided in the present application can be implemented in a computer by a processor by executing a corresponding program instruction, for example, implemented at a PC end by using a C++ language of a Windows operating system, or implemented by using a corresponding application design language of another system such as Linux, Android, or iOS, and implemented based on processing logic of a quantum computer. Specifically, in an embodiment of the multi-blockchain network data processing apparatus provided in the present application, the apparatus can include a processor and a memory configured to store a processor executable instruction, and the processor executes the instruction to: obtain a data processing request, and extract an identifier in the data processing request that is used to identify a blockchain network to which the data processing request belongs; and execute corresponding processing logic on the data processing request based on the identifier.

The embodiments in the present specification are all described progressively, for same or similar parts in the embodiments, reference can be made to these embodiments, and each embodiment focuses on a difference from other embodiments. Particularly, a hardware plus program embodiment is basically similar to a method embodiment, and therefore, is described briefly. For related parts, refer to partial descriptions in the method embodiment.

Specific embodiments of the present specification have been described previously. Other embodiments are within the scope of the appended claims. In some cases, actions or steps described in the claims can be performed in a sequence different from that in the embodiments and a desired result can still be obtained. In addition, the process described in the accompanying drawings does not necessarily require a detailed order or sequence to obtain the desired result. In some implementations, multitask processing and parallel processing are also possible or may be advantageous.

Based on the blockchain data processing apparatus provided in the present application, a network identifier of a blockchain network is used to isolate communication requests, data storage, data read and write, etc. of different blockchain networks. Therefore, a multi-network node in a multi-blockchain network can simultaneously link different blockchain networks, so as to simultaneously process data of a plurality of blockchain networks. By using the implementation solutions of the present application, system complexity of operation and maintenance of a multi-network node can be effectively reduced, complexity and difficulty of node operation and maintenance and system interaction of a service system that participates in an entire network can be reduced, and a data processing capability of a multi-blockchain network can be improved.

The apparatus or method can be used in a server of a service system participating in a multi-blockchain network, so that the server can simultaneously link different blockchain networks, to simultaneously process data of a plurality of blockchain networks, reduce complexity of system operation and maintenance, decrease operation and maintenance costs, and reduce complexity of service system interaction. Specifically, a blockchain node server provided in the present application includes at least one processor and a memory configured to store a processor executable instruction, and the processor executes the instruction to: obtain a data processing request, and extract an identifier in the data processing request that is used to identify a blockchain network to which the data processing request belongs; and execute corresponding processing logic on the data processing request based on the identifier.

Figure 8:
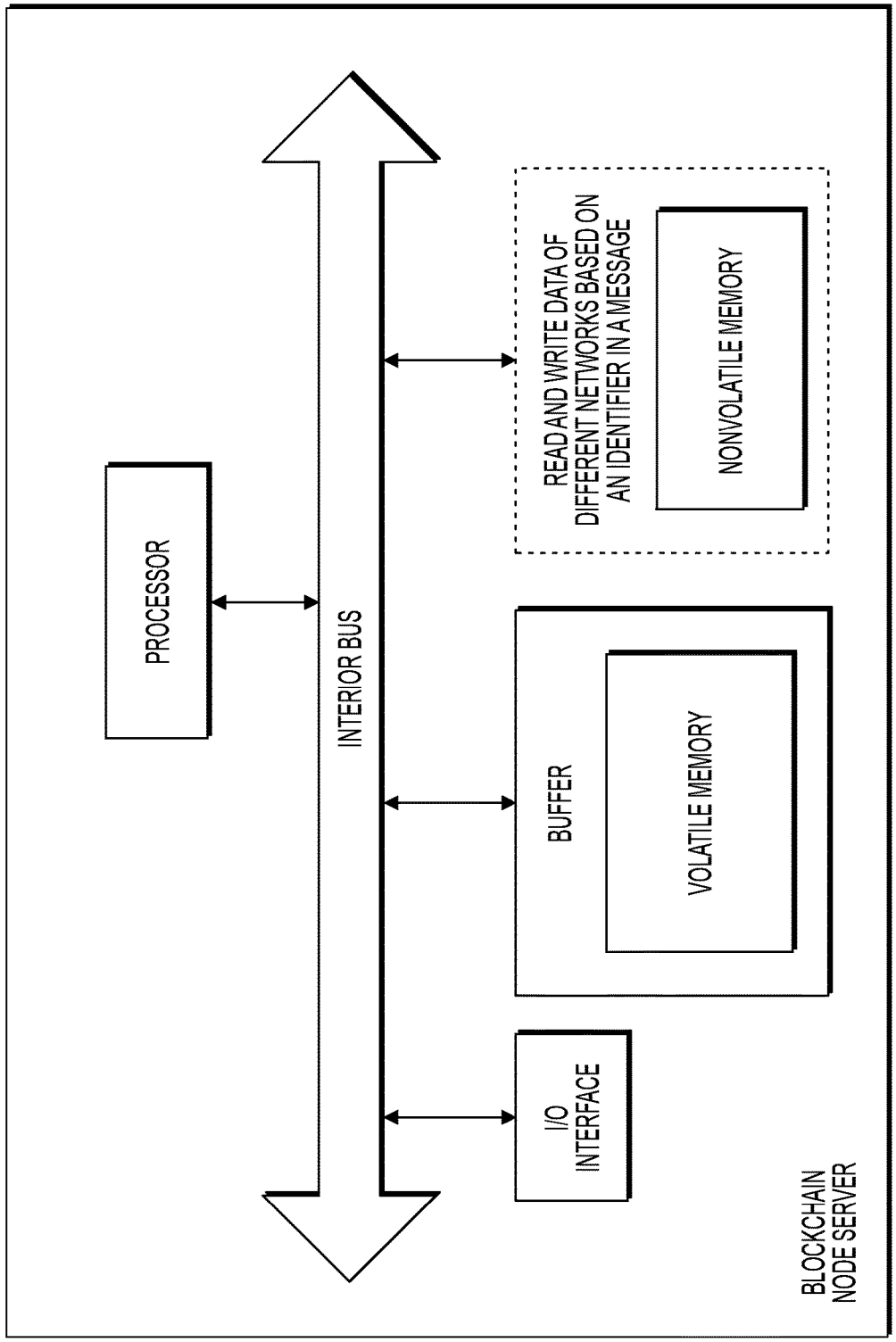
FIG. 8 is a schematic structural diagram illustrating a blockchain node server, according to the present application.

FIG. 8 is a schematic structural diagram illustrating a blockchain node server, according to the present application. It should be noted that, based on the descriptions of the method embodiment, the apparatus or server can further include another implementation. For detailed implementations, reference can be made to the descriptions of the method embodiment, and are not described one by one here again.

According to the multi-blockchain network data processing method and apparatus, and the data storage system provided in the present application, an identifier of a blockchain network is used to distinguish data storage, data read and write, and data communication, etc. of different networks. Therefore, a multi-network node in a multi-blockchain network can simultaneously link different blockchain networks, so as to simultaneously process data of a plurality of blockchain networks. By using the implementation solution of the present application, system complexity of operation and maintenance of a multi-network node can be effectively reduced, complexity and difficulty of node operation and maintenance and system interaction of a service system that participates in an entire network can be reduced, and a data processing capability of a multi-blockchain network and system stability and reliability can be improved.

Although the descriptions such as data setting, data acquisition, data exchange, data computing, and data determining such as a method for determining an identifier, a method for storing blockchain data on a node, exchange of a data processing request between nodes are mentioned in the present application, the present application is not necessarily limited to cases that conform to an industry communications standard, standard blockchain data storage, computer processing, and storage rules, or the cases described in the embodiments of the present application. An implementation solution obtained after making slight modification based on some industry standards, or by using a self-defined method, or based on implementation described in the embodiments can also achieve an implementation effect that is the same as, equivalent to, or similar to the previous embodiments or that can be predicted after transformation. An embodiment using a data obtaining, storage, determining, and processing method obtained after such modification or transformation is still within the scope of optional implementation solutions of the present application.

In the 1990s, it can be distinguished whether improvement on a technology is hardware improvement (for example, improvement on a circuit structure such as a diode, a transistor, or a switch) or software improvement (improvement on a method process). However, with the development of technologies, current improvement on many method processes can already be considered as direct improvement on a hardware circuit structure. Almost all designers obtain the corresponding hardware circuit structure by programming the improved method process into a hardware circuit. Therefore, it cannot be said that improvement on a method process cannot be implemented by using a hardware entity module. For example, a programmable logic device (PLD) (for example, a field programmable gate array (FPGA)) is such an integrated circuit, and a logical function of the programmable logic device is determined by a user by programming a device. The designers perform voluntary programming to "integrate" a digital system into a single PLD without requiring a chip manufacturer to design and formulate a dedicated integrated circuit chip. In addition, currently, instead of manually formulating an integrated circuit chip, this type of programming is mostly implemented by "logic compiler" software. The software is similar to a software compiler used during program development and writing, and original code needs to be written by using a detailed programming language before being compiled. The programming language is referred to as a hardware description language (HDL), and there are a plurality of types of HDL instead of one type, such as advanced Boolean expression language (ABEL), Altera hardware description language (AHDL), Confluence, Cornell University programming language (CUPL), HDCal, Java hardware description language (JHDL), Lava, Lola, MyHDL, PALASM, Ruby hardware description language (RHDL), etc. Currently, very-high-speed integrated circuit hardware description language (VHDL) and Verilog are most commonly used. A person skilled in the art should also understand that, because logic programming with respect to the method procedure is performed by using several described hardware description languages, and the several described hardware description languages can be programmed to an integrated circuit, a hardware circuit that implements the logical method procedure can be obtained.

A controller can be implemented by using any suitable method, for example, the controller can be a microprocessor or a processor, or a computer readable medium, a logic gate, a switch, an application-specific integrated circuit (ASIC), a programmable logic controller, or an embedded microprocessor that stores computer readable program code (such as software or firmware) that can be executed by the microprocessor or the processor. Examples of the controller include but are not limited to the following microprocessors: ARC 625D, Atmel AT91SAM, Microchip PIC18F26K20, and Silicone Labs C8051F320. A controller of a memory can further be implemented as a part of control logic of the memory. A person skilled in the art also knows that, in addition to implementing the controller merely by using the computer readable program code, method steps can be logically programmed, so that the controller implements a same function by using a logic gate, a switch, an application-specific integrated circuit, a programmable logic controller, an embedded microcontroller, etc. Therefore, such a controller can be considered as a hardware component, and an apparatus that is included in the controller and that is configured to implement various functions can also be considered as a structure inside the hardware component. Alternatively, the apparatus configured to implement various functions can even be considered as both a software module for implementing the method and a structure inside the hardware component.

The system, apparatus, module, or unit described in the previous embodiments can be implemented by a computer chip or an entity, or implemented by a product that has a particular function. A typical implementation device is a computer. Specifically, the computer can be, for example, a personal computer, a laptop computer, a vehicle-mounted human computer interaction device, a cellular phone, a camera phone, a smart phone, a personal digital assistant, a media player, a navigation device, an email device, a game controller, a tablet computer, a wearable device, or a combination of any devices of these devices.

Although the present application provides method operation steps described in the embodiments or flowcharts, conventionally or without creative means, more or fewer operations and steps can be included. A step sequence in the embodiments is merely one of numerous step execution sequences, and does not represent a unique execution sequence. An actual apparatus or terminal can perform execution in the method sequence shown in the embodiments or the accompanying drawings or in parallel (for example, an environment of parallel processors or multi-thread processors, or even an environment of distributed data processing). The terms "include", "comprise", or their any other variants are intended to cover a non-exclusive inclusion, so that a process, a method, a product, or a device that includes a list of elements not only includes those elements but also includes other elements which are not expressly listed, or further includes elements inherent to the process, method, product, or device. In the case of no more limitations, the process, method, product, or device of the elements can further include other same or equal elements.

For ease of description, the previous apparatus is described by dividing the functions into various modules. During implementation of the present application, functions of the modules can be implemented in same or a plurality of pieces of software and/or hardware, or modules that implement a same function can be implemented by a combination of a plurality of submodules and subunits. The previously described apparatus embodiments are merely examples. For example, the unit division is merely logical function division and can be other division in actual implementation. For example, a plurality of units or components can be combined or integrated into another system, or some features can be ignored or not performed. In addition, the displayed or discussed mutual couplings or direct couplings or communication connections can be implemented by using some interfaces. The indirect couplings or communication connections between the apparatuses or units can be implemented in electronic, mechanical, or other forms.

A person skilled in the art also knows that, in addition to implementing the controller merely by using the computer readable program code, method steps can be logically programmed, so that the controller implements a same function by using a logic gate, a switch, an application-specific integrated circuit, a programmable logic controller, an embedded microcontroller, etc. Therefore, such a controller can be considered as a hardware component, and an apparatus that is included in the controller and that is configured to implement various functions can also be considered as a structure inside the hardware component. Alternatively, the apparatus configured to implement various functions can even be considered as both a software module for implementing the method and a structure inside the hardware component.

The present disclosure is described with reference to the flowcharts and/or block diagrams of the method, the device (system), and the computer program product based on the embodiments of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of any other programmable data processing device to generate a machine, so that the instructions executed by a computer or a processor of any other programmable data processing device generate an apparatus for implementing a detailed function in one or more processes in the flowcharts and/or in one or more blocks in the block diagrams.

These computer program instructions can be stored in a computer readable memory that can instruct the computer or any other programmable data processing device to work by using a detailed method, so that the instructions stored in the computer readable memory generate an artifact that includes an instruction apparatus. The instruction apparatus implements a detailed function in one or more processes in the flowcharts and/or in one or more blocks in the block diagrams.

These computer program instructions can be loaded onto the computer or another programmable data processing device, so that a series of operations and steps are performed on the computer or the another programmable device, thereby generating computer-implemented process. Therefore, the instructions executed on the computer or another programmable device provide steps for implementing a detailed function in one or more processes in the flowcharts and/or in one or more blocks in the block diagrams.

In a typical configuration, a computing device includes one or more processors (CPU), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can implement information storage by using any method or technology. Information can be a computer readable instruction, a data structure, a program module, or other data. Examples of the computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a tape and disk storage or another magnetic storage device, or any other non-transmission media that can be configured to store information that a computing device can access. Base on the definition in the present specification, the computer readable medium does not include transitory media (transitory media) such as a modulated data signal and carrier.

A person skilled in the art should understand that the embodiments of the present application can be provided as a method, a system, or a computer program product. Therefore, the present application can use a form of hardware-only embodiments, software-only embodiments, or embodiments with a combination of software and hardware. Moreover, the present application can use a form of a computer program product that is implemented on one or more computer-usable storage media (including but not limited to a disk memory, a CD-ROM, an optical memory, etc.) that include computer usable program code.

The present application can be described in the general context of computer executable instructions executed by a computer, for example, a program module. Generally, the program module includes a routine, a program, an object, a component, a data structure, etc. for executing a particular task or implementing a particular abstract data type. The present application can also be practiced in distributed computing environments in which tasks are performed by remote processing devices that are connected by using a communications network. In a distributed computing environment, the program module can be located in both local and remote computer storage media including storage devices.

The embodiments in the present specification are all described progressively, for same or similar parts in the embodiments, reference can be made to these embodiments, and each embodiment focuses on a difference from other embodiments. Particularly, a system embodiment is basically similar to a method embodiment, and therefore, is described briefly. For related parts, refer to partial descriptions in the method embodiment. In descriptions in the present specification, descriptions about such reference terms as "an embodiment", "some embodiments", "an example", "a detailed example", or "some examples" mean that detailed features, structures, materials, or characteristics described with reference to the embodiments or examples are included in at least one embodiment or example of the present application. In the present specification, the previous example expressions of the terms are not necessarily with respect to a same embodiment or example. In addition, the described detailed features, structures, materials, or characteristics can be combined by using a proper method in any one or more of the embodiments or examples. In addition, a person skilled in the art can integrate or combine different embodiments or examples and characteristics of different embodiments or examples described in the present specification, provided that they do not conflict with each other.

The previous embodiments are merely embodiments of the present application, and are not intended to limit the present application. A person skilled in the art can make various modifications and variations to the present application. Any modification, equivalent replacement, or improvement made without departing from the spirit and principle of the present application shall fall within the scope of the claims of the present application.

Figure 9:
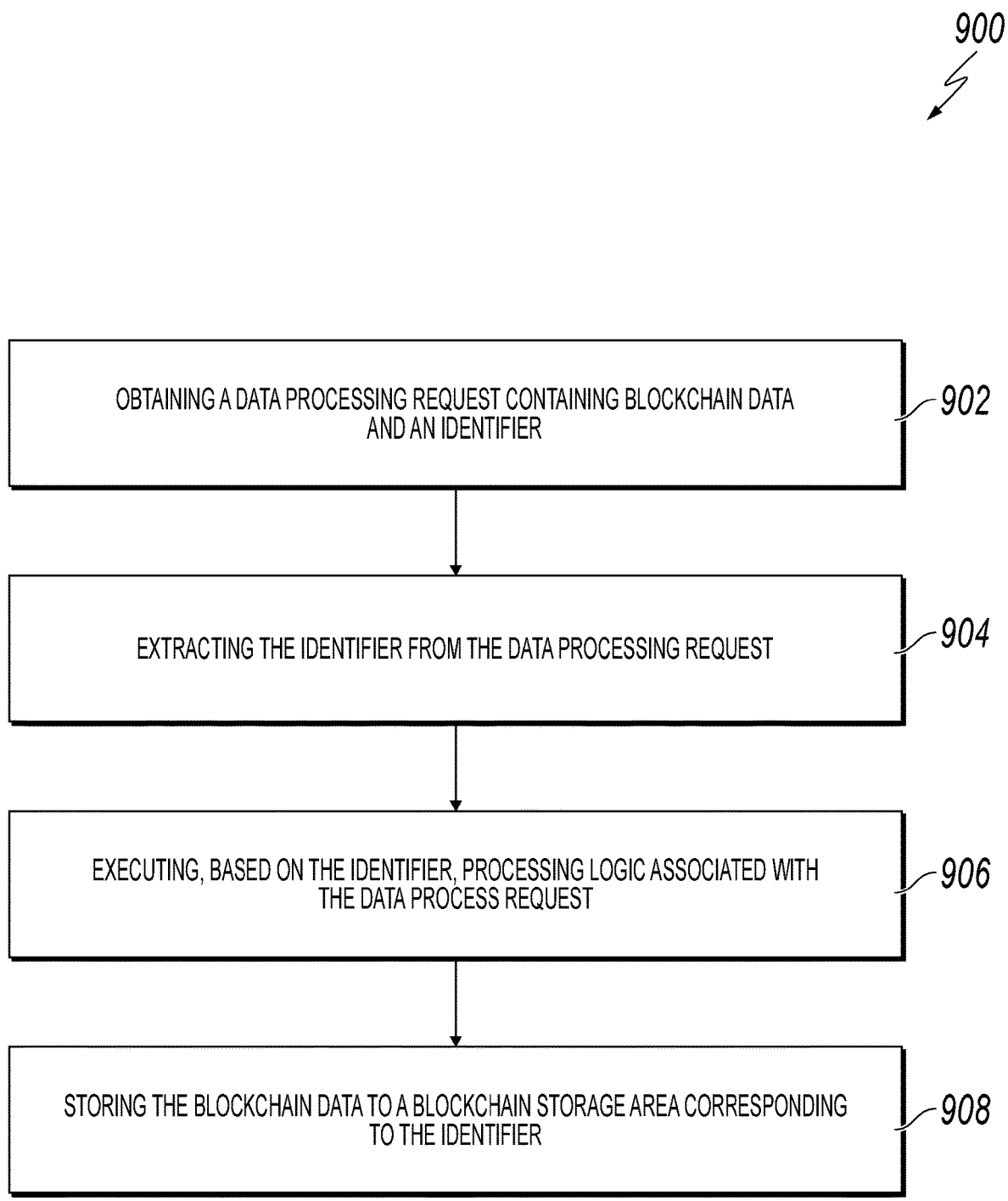
FIG. 9 is a flowchart illustrating an example of a computer-implemented method for multi-blockchain network data processing, according to an implementation of the present disclosure.

FIG. 9 is a flowchart illustrating an example of a computer-implemented method 900 for multi-blockchain network data processing, according to an implementation of the present disclosure. For clarity of presentation, the description that follows generally describes method 900 in the context of the other figures in this description. However, it will be understood that method 900 can be performed, for example, by any system, environment, software, and hardware, or a combination of systems, environments, software, and hardware, as appropriate. In some implementations, various steps of method 900 can be run in parallel, in combination, in loops, or in any order.

At 902, a data processing request is obtained, where the data processing request contains blockchain data and an identifier used to identify a blockchain network to which the data processing request belongs. In some implementations, the identifier is generated based on a network identifier of the blockchain network. In some implementations, the data processing request includes a data storage request message. In some implementations, the data processing request includes a data read request message. From 902, method 900 proceeds to 904.

At 904, the identifier from the data processing request is extracted. From 904, method 900 proceeds to 906.

At 906, corresponding processing logic associated with the data processing request is executed based on the identifier. In some implementations, executing the corresponding processing logic further includes reading blockchain data from the blockchain storage area corresponding to the identifier. In some implementations, the data processing request comprises a node communication message. In some implementations, the node communication message is exchanged in the blockchain network corresponding to the identifier. From 906, method 900 proceeds to 908.

At 908, the blockchain data is stored to a blockchain storage area corresponding to the identifier. After 908, method 900 stops.

The subject matter described in this specification can be implemented so as to realize particular advantages or technical effects. The described method for multi-blockchain network data processing can be used to can link different blockchain networks based on the implementation solution provided in the present application. For example, a system node server links a public blockchain network A and an alliance-specific blockchain network B. In existing technology, a node A1 used to access the public blockchain network A and a node B1 used to access the alliance-specific blockchain network B need to be separately configured. However, in the present application, a node P can be directly deployed, and the node P can access both the public blockchain network A and the alliance-specific blockchain network B, and can process data packets of the two networks. Therefore, system configuration is simplified, data exchange complexity is reduced, data processing efficiency and stability of a server are improved, and high availability of the server is ensured.

The described method can be incorporated into computing devices (such as, mobile computing devices). In some implementations, data associated with the described method can be displayed on a graphical user interface. Based on one or more results of the described method, determination of whether to perform subsequent actions (for example, displaying data, operating a software application, storing data, sending data across a network, or displaying data on a graphical user interface) can be made.

The described methodology can also ensure the efficient usage of computer resources. For example, efficient use of processor processing cycles, network bandwidth, and memory usage can be permitted through the described simplified system configuration, reduction in data exchange complexity, increase in data processing efficiency, and increase in server stability.

In some implementations, a graphical user interface can be analyzed to ensure that graphical elements used in multi-blockchain network data processing operations can be positioned on graphical user interfaces to be least obtrusive for a user (for example, to obscure the least amount of data and to avoid covering any critical or often-used graphical user interface elements).

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   obtaining a data processing request containing blockchain data and a first identifier used to identify a first blockchain network from a multi-blockchain network to which the data processing request belongs, at least the first blockchain network and a second blockchain network of the multi-blockchain network being linked by at least one multi-blockchain network node, wherein the multi-blockchain network node is in the first blockchain network and in the second blockchain network, and wherein the multi-blockchain network node comprises storage space divided into a plurality of different storage areas for different blockchain networks, respectively, wherein the multi-blockchain network node comprises a ledger for the first blockchain network and a ledger for the second blockchain network;
   extracting the first identifier from the data processing request;
   executing, based on the first identifier, corresponding processing logic associated with the data processing request; and
   storing the blockchain data to a first blockchain storage area, corresponding to the first identifier, of the at least one multi-blockchain network node.

2. The computer-implemented method of claim 1, further comprising generating the first identifier based on a network identifier of the first blockchain network.

3. The computer-implemented method of claim 1, wherein the data processing request comprises a data storage request message.

4. The computer-implemented method of claim 1, wherein the data processing request comprises a data read request message.

5. The computer-implemented method of claim 1, wherein executing corresponding processing logic associated with the data processing request further comprises reading blockchain data from the first blockchain storage area.

6. The computer-implemented method of claim 1, wherein the data processing request comprises a node communication message.

7. The computer-implemented method of claim 6, further comprising exchanging the node communication message in the first blockchain network.

8. The computer-implemented method of claim 1, wherein the data processing request is a first data processing request and the blockchain data is a first set of blockchain data, the method further comprising:
   obtaining a second data processing request containing a second set of blockchain data and a second identifier used to identify the second blockchain network;
   extracting the second identifier from the second data processing request;
   executing, based on the second identifier, corresponding processing logic associated with the second data processing request; and
   storing the second set of blockchain data to a second blockchain storage area, corresponding to the second identifier, of the at least one multi-blockchain network node.

9. A non-transitory, computer-readable medium storing one or more instructions executable by a computer system to perform operations comprising:
   obtaining a data processing request containing blockchain data and a first identifier used to identify a first blockchain network from a multi-blockchain network to which the data processing request belongs, at least the first blockchain network and a second blockchain network of the multi-blockchain network being linked by at least one multi-blockchain network node, wherein the multi-blockchain network node is in the first blockchain network and in the second blockchain network, and wherein the multi-blockchain network node comprises storage space divided into a plurality of different storage areas for different blockchain networks, respectively, wherein the multi-blockchain network node comprises a ledger for the first blockchain network and a ledger for the second blockchain network;

extracting the first identifier from the data processing request;

executing, based on the first identifier, corresponding processing logic associated with the data processing request; and storing the blockchain data to a first blockchain storage area, corresponding to the first identifier, of the at least one multi-blockchain network node.

10. The non-transitory, computer-readable medium of claim 9, further comprising one or more instructions to generate the first identifier based on a network identifier of the first blockchain network.

11. The non-transitory, computer-readable medium of claim 9, wherein the data processing request comprises a data storage request message.

12. The non-transitory, computer-readable medium of claim 9, wherein the data processing request comprises a data read request message.

13. The non-transitory, computer-readable medium of claim 9, further comprising one or more instructions to execute corresponding processing logic further comprising reading blockchain data from the first blockchain storage area.

14. The non-transitory, computer-readable medium of claim 9, wherein the data processing request comprises a node communication message.

15. The non-transitory, computer-readable medium of claim 14, further comprising one or more instructions to exchange the node communication message in the first blockchain network.

16. The non-transitory, computer-readable medium of claim 9, wherein the data processing request is a first data processing request and the blockchain data is a first set of blockchain data, and wherein the operations further comprise:

obtaining a second data processing request containing a second set of blockchain data and a second identifier used to identify the second blockchain network;

extracting the second identifier from the second data processing request;

executing, based on the second identifier, corresponding processing logic associated with the second data processing request; and storing the second set of blockchain data to a second blockchain storage area, corresponding to the second identifier, of the at least one multi-blockchain network node.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

obtaining a data processing request containing blockchain data and a first identifier used to identify a first blockchain network from a multi-blockchain network to which the data processing request belongs, at least the first blockchain network and a second blockchain network of the multi-blockchain network being linked by at least one multi-blockchain network node, wherein the multi-blockchain network node is in the first blockchain network and in the second blockchain network, and wherein the multi-blockchain network node comprises storage space divided into a plurality of different storage areas for different blockchain networks, respectively, wherein the multi-blockchain network node comprises a ledger for the first blockchain network and a ledger for the second blockchain network;

extracting the first identifier from the data processing request;

executing, based on the first identifier, corresponding processing logic associated with the data processing request; and storing the blockchain data to a first blockchain storage area, corresponding to the first identifier, of the at least one multi-blockchain network node.

18. The computer-implemented system of claim 17, further comprising one or more operations to generate the first identifier based on a network identifier of the first blockchain network.

19. The computer-implemented system of claim 17, wherein the data processing request comprises a data storage request message.

20. The computer-implemented system of claim 17, wherein the data processing request comprises a data read request message.

21. The computer-implemented system of claim 17, further comprising one or more operations to execute corresponding processing logic further comprising reading blockchain data from the first blockchain storage area.

22. The computer-implemented system of claim 17, wherein the data processing request comprises a node communication message comprising one or more operations to exchange the node communication message in the first blockchain network.

23. The computer-implemented system of claim 17, wherein the data processing request is a first data processing request and the blockchain data is a first set of blockchain data, and wherein the one or more operations further comprise:

obtaining a second data processing request containing a second set of blockchain data and a second identifier used to identify the second blockchain network;

extracting the second identifier from the second data processing request;

executing, based on the second identifier, corresponding processing logic associated with the second data processing request; and storing the second set of blockchain data to a second blockchain storage area, corresponding to the second identifier, of the at least one multi-blockchain network node.

* * * * *